July 22, 1941.   H. W. DOWNING   2,250,299
OIL FILTER
Filed Jan. 18, 1937   2 Sheets-Sheet 2

Inventor
HERMAN W. DOWNING.
By Howard J. Whelan.
Attorney

Patented July 22, 1941

2,250,299

UNITED STATES PATENT OFFICE 2,250,299

OIL FILTER

Herman W. Downing, Baltimore, Md., assignor to The Oil Clarifier Corporation, a corporation of Maryland Application January 18, 1937, Serial No. 121,195

1 Claim. (Cl. 210—131)

This invention refers to filters and especially those types adaptable for use with engines to clean the lubricating oil used for same. It has among its objects to provide an unusually efficient filter; one that has means for relieving excessive pressures under abnormal conditions; and a construction that enables its cartridge to be used in conventional filters of this type and nature.

The construction of this invention is such that it permits the filter to be used effectively with the engine when the latter is started and cold. Under the starting conditions, the lubricating oil in the engine acts like a brake to slow up its movement and create additional resistance. The oil is sluggish because it is cold and thick and sticks the rubbing surfaces together more or less tightly. The primal resistance is considerable and enforces the engines propelling element to built up a very high pressure to bring about circulation of the oil. When this pressure reaches the filter, it presses hard on the filter cartridge and its contents and tends to create a channeling action. This channeling action is disadvantageous to the filter and may ruin the cartridge. The filter in this invention is provided with a relief valve to by-pass the oil under such pressure conditions and permit the circulation of the oil at or near a normal pressure. The materials used in the cartridge are of a different nature and arrangement than other known forms, to create a resilient filler having special characteristics for removing dirt and lint from the oil to be clarified.

In the construction indicated in the drawings.

Similar reference characters refer to similar parts throughout the drawings.

Figure 1:
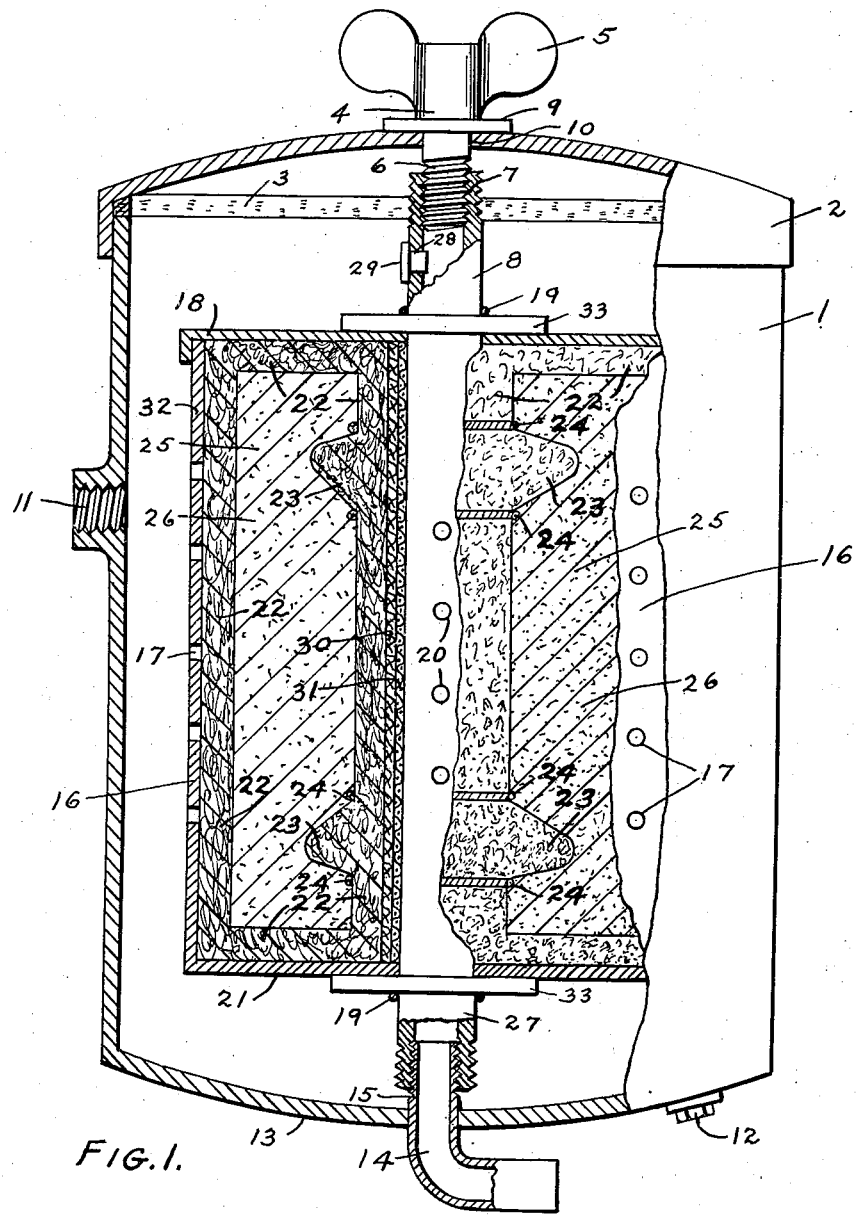
Figure 1 is a sectional elevation through the middle of a form of filter embodying this invention, with portions left in to show the exterior outlines of same.
Figure 2:
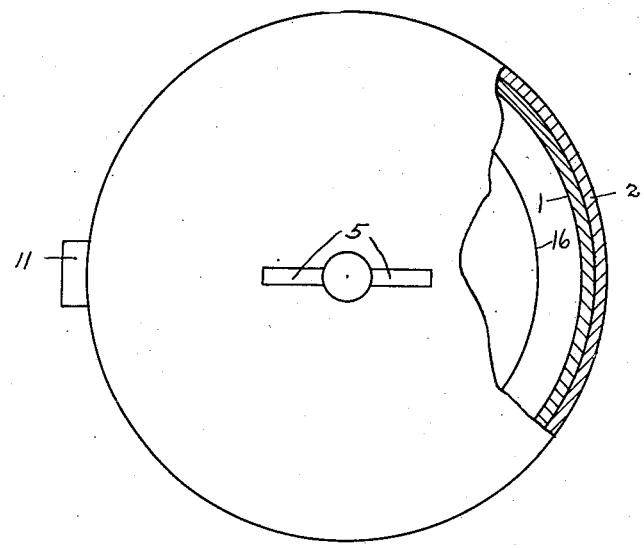
Figure 2 is a plan view of the filter shown in Figure 1 with portions of its casing partly broken away to indicate the construction of the cartridge inside same.
Figure 3:
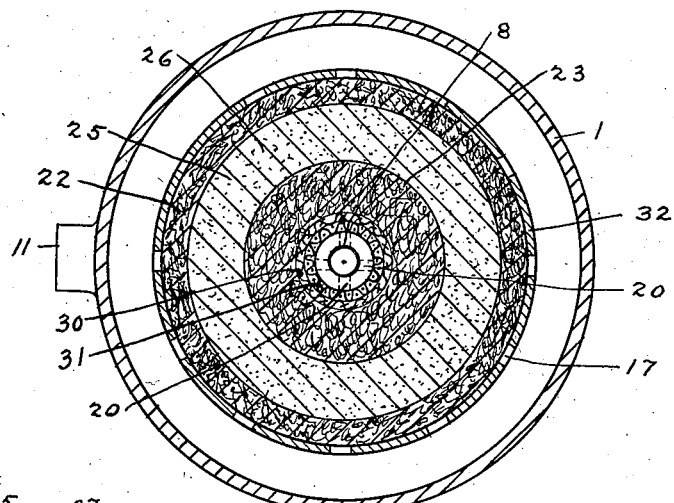
Figure 3 is a section taken along the line 3—3 of Figure 1 looking transversely on the filter.
Figure 4:
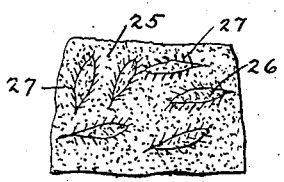
Figure 4 is an enlarged detail of the filler material used in the cartridge to indicate its general make-up.

In the construction indicated, an outer casing or shell 1 forms the main exterior body of the device. It is provided with a cover 2 adaptable for facile removal and placement to permit access to the interior. A cork gasket 3 mounted on the top of the casing as shown, serves to keep the filter tight. A screw plug adjustable in the cover has a wing nut 5 for turning same. The lower portion 6 is screw threaded and engages with the upper portion 7 of a central tube 8. A washer 9 on the top surface of the cover 2 is engaged by wing-nut shoulder of the plug 4, and closes the opening or hole 10 in the cover. The shell 1 has an inlet orifice 11 in its side wall, a clean-out hole and plug 12 in the bottom portion 13, and an outlet pipe 14, the end portion of which is screw-threaded at 15.

The filler member of the filter consists of a cartridge 16 having a series of openings 17 in its vertical walls, which are spaced from the top and bottom portions of the cartridge in a series of rows. A cap 18 closes the cartridge as shown, while the central tube 8 passes through and is suitably secured thereto by washers 33 and welds 19 or other suitable means. The tube extends beyond the cartridge and has its end portions 7 and 27 screw-threadably engaged with the plug 6 and outlet pipe 14 as may be seen in Figure 1. The central tube has its walls perforated with holes 20 spaced towards the middle portions of the cartridge and away from the cap 18 and bottom plate 21. A rayon cloth screen 30 is mounted above or over a conventional closely meshed screen 31 secured to the central or oil-carrying-off tube 8. These screens pack together and form an efficient barrier to the passage of fine grit, filler material and dirt into the tube.

The filler material of the cartridge comprises an outside wall 22 of cotton waste laid against the side walls 32 of the cartridge, the cap 18, the bottom 21 and circumscribing the central tube 8 as shown. Portions of the waste are formed into shoulders 23 located beyond the holes in the tube as indicated. Cords 24 hold the waste wall in place around the central tube. The fact that this tube is termed central tube does not essentially mean that it must be located along the central axis of the cartridge. The term is generic in meaning sufficient to include positions passing through the cartridge provided same are spaced from the walls of same towards the axis mentioned. The filler material included in the space within the walls of waste, preferably consists of fuller's earth 25 and grain chaff 26 mixed intimately together. The purpose of the chaff is to increase the net work of fuzzy or hairy antennae 27 extending through the mass of fuller's earth and collect material from the oil passing through. At the same time the fuller's earth is obstructed in its tendency to matt and separate from the chaff.

As stated above, the cartridge filler is resilient in nature. While it will be obvious that the particulate mass of filter material is free from resiliency, this property is conferred by the presence of the cotton waste. In other words, the layers or mats of cotton waste press resiliently against the central particulate mass to transmit resiliency throughout the mass.

Particular attention is directed to the fact that this resiliency renders the particulate filter bed continuous and uniform at all times. Thus, it will be appreciated that after an extended period of service any bed of particulate, discrete grains would ultimately through wear or compacting tend to shrink or settle, thus leaving voids adjacent the top. The resiliency of the present bed, however, compensates adequately for this tendency so that there is no settling or void formation even after extended periods of time. In other words, the opposed side layers 22 of fibrous cotton material transmit a lateral resilient pressure, while the top layer transmits a downward resilient force. It will be obvious from the foregoing that even if the upper layer 22 were omitted the lateral resiliency would continually tend to urge the top margin of the particulate mass into contact with the upper wall 18 of the cartridge, since the resilient forces would also be resolved in an upward direction. Accordingly, all of the resilient pads mutually cooperate to prevent the formation of top voids.

The central tube 8 is penetrated at 28 for the placement of a by-pass valve 29 set to open for the passage of oil when the pressure of the latter rises abnormally. The oil then by-passes into the tube and passes through the outlet pipe 14 without clarification in the cartridge. This feature prevents the cartridge or its contents from being subject to injurious pressures and the passage of oil therethrough at high pressure. This lessens the load on the oil pump, permits cold and congealed oil to flow through, and warms up the central tube and cartridge quickly, all of which is beneficial.

As the oil is further warmed and rendered more fluid, it assumes a condition which increases its mobility and lessens its viscosity, until it is enabled to pass through the filter material without undue resistance against it. When this resistance is lowered sufficiently, the oil will pass through the filter and the by-pass valve will automatically close because of the lowered pressure.

The operation of the filter is as follows: The lubricating oil from the cold engine passes through the inlet orifice 11, located close to the middle lines of the shell and cartridge, into the interior of the shell which it fills. The thick oil passes so slowly into the filter material that the pressure increases until it rises to a limit that causes the by-pass valve to open and bypass the oil around the filter cartridge. The oil flows through the tube, warms same, and also "draws" on the oil in the cartridge, until the resistance is reduced in the filter material and the oil flows through and is clarified. The oil that has passed through is clarified as it passes through in following cycles. The action of the cotton waste, and the fuller's earth with chaff prevents channeling, while the position of the openings 17 and shoulders 23 function to direct the flow of grit and sediment more positively away from the openings in the central tube, to the sludge space at the bottom of the cartridge. The arrangement of the tube permits its ready insertion in the shell and quick attachment thereto, particularly as nuts and loose locking parts are avoided.

While but one modification of the invention is indicated in the drawings, it is not intended to limit this application for patent to this particular form, or in any way, otherwise than limited by the prior art, as it is appreciated that other constructions could be made that would employ the same principles and come within the scope of the appended claim.

Having thus described the invention, what is claimed is:

A device for filtering oil, comprising a casing, means for conveying oil to be filtered to said casing, a filter bed within said casing and comprising a uniform mixture of loose granular particulate fuller's earth and chaff, means to direct said oil to be filtered substantially horizontally through said loose bed of granular material comprising a generally upstanding wall adjacent said filter bed, said wall having inlet means therein, a well within said filter bed for collecting the oil filtered therethrough, an outlet tube for the filtered oil communicating with said well, and a wall of cotton waste enclosing said filter bed on the inlet portions thereof and interposed between said filter bed and the well.

HERMAN W. DOWNING.